Nov. 17, 1931.  A. D. GALLAGHER  1,832,010
TWO-WAY TRACTOR PLOW
Filed March 14, 1930   3 Sheets-Sheet 3
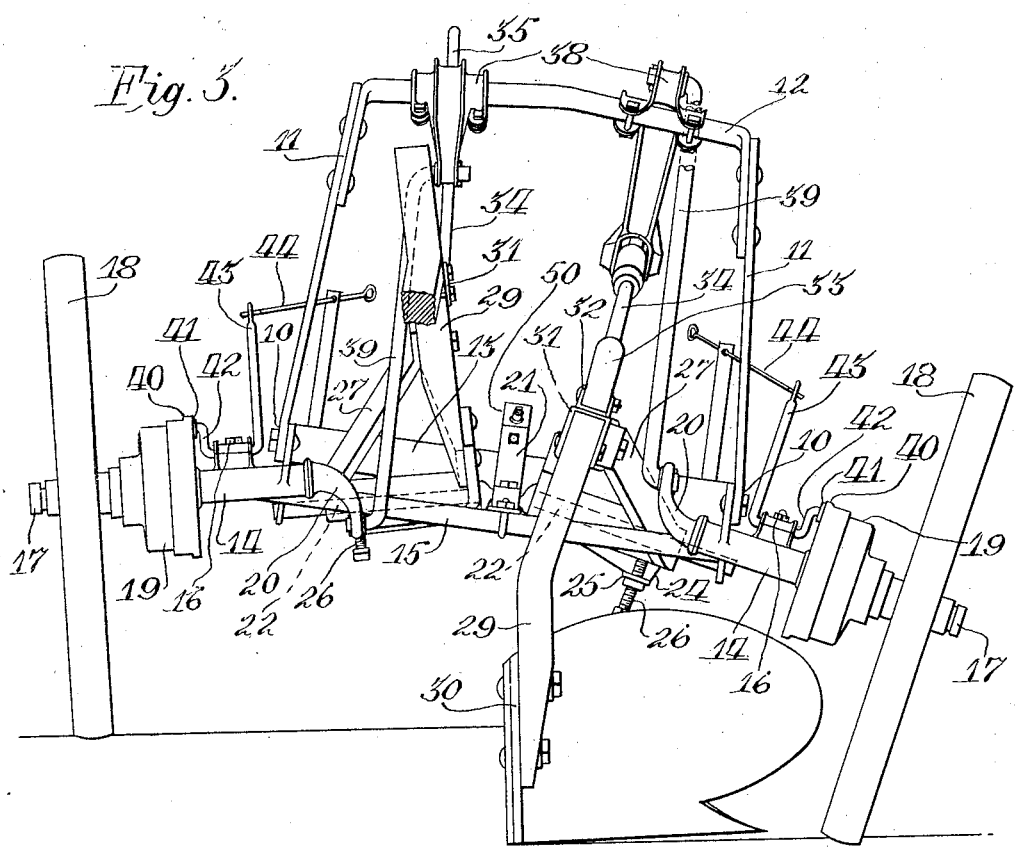
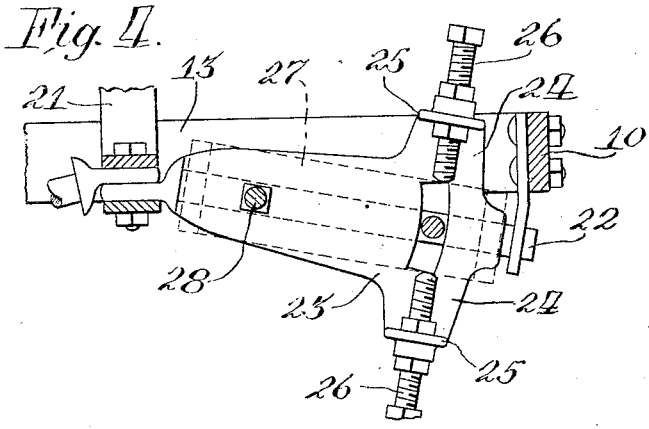
Inventor
Arthur D. Gallagher
By N. T. Delisle
Atty.

Patented Nov. 17, 1931

1,832,010

UNITED STATES PATENT OFFICE

ARTHUR D. GALLAGHER, OF CANTON, ILLINOIS, ASSIGNOR, BY MESNE ASSIGNMENTS, TO FRED GERLACH AND ARNOLD B. KELLER, TRUSTEES, BOTH OF CHICAGO, ILLINOIS

TWO WAY TRACTOR PLOW

Application filed March 14, 1930. Serial No. 435,713.

This invention relates to tractor pulled plows of the two-way or hillside type.

The main object of the invention is to provide a simplified form of carrying frame and lifting mechanism for plows of the type stated and to construct and arrange the two lateral halves of the machine and the plows carried side by side thereon, so as to attain automatic leveling of the operating plow with one of the carrying wheels running in the furrow, without employement of adjustable carrying wheels as heretofore done.

Another object is to provide a novel suspension type of supporting and lift mechanism for each plow beam, which will permit of easy adjustment for depth and tilt of the respective plows and provide a high ground clearance for the idle plow during operation of the machine.

Still another object is to provide simple mechanism for actuating the respective beam lifts by tractor power.

Other objects and advantages will become apparent from the detailed description hereinafter given of the organization and details of construction embodying the invention.

In the accompanying drawings:

Figure 3 is a rear view;

Figure 4 is an enlarged detail view of the adjustable front connection for each plow beam; and, Figure 5 is a detail view of a part used in the adjustable connection shown in Figure 4.

Figure 1:
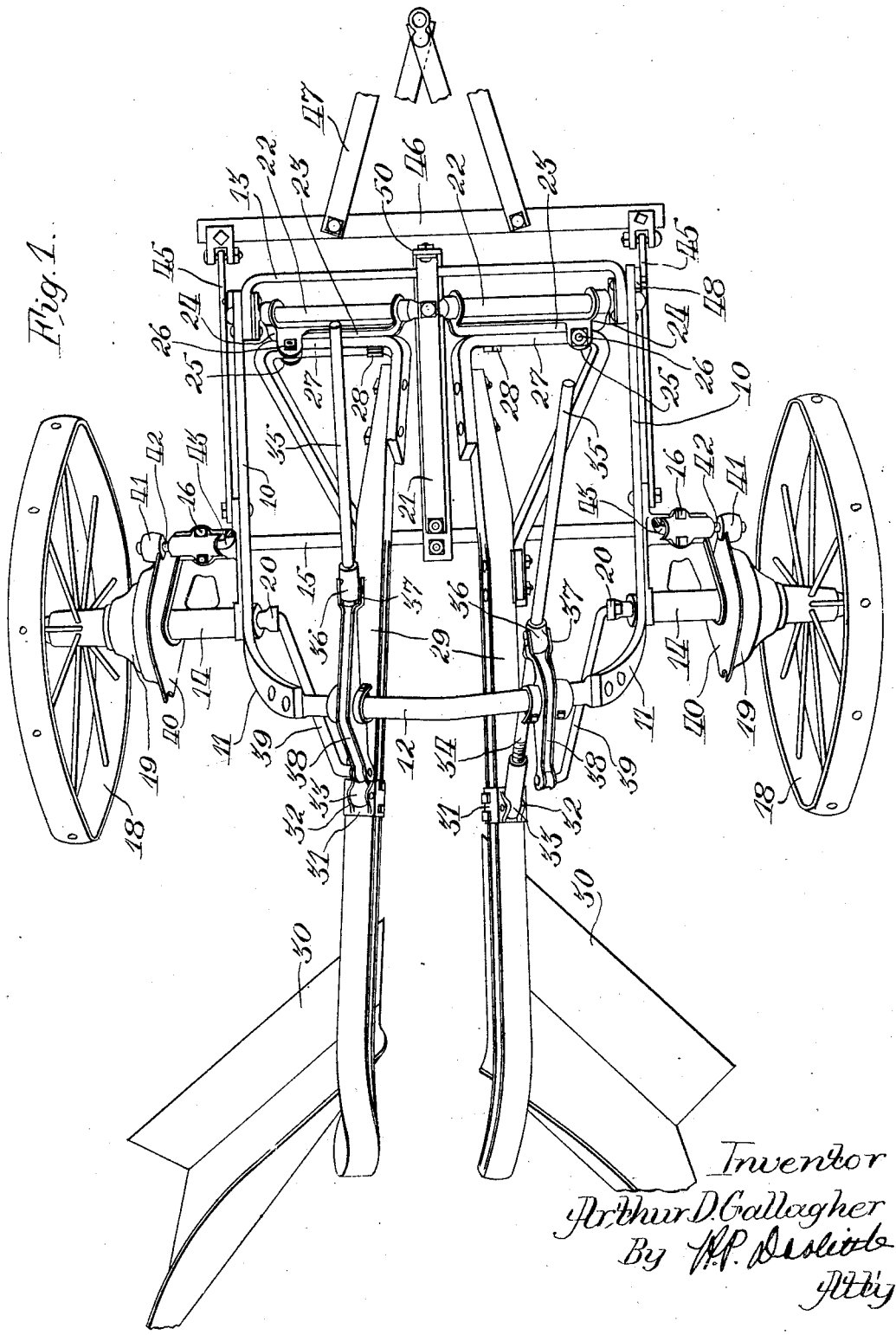
Figure 1 is a plan view of a two-way plow embodying the invention.
Figure 2:
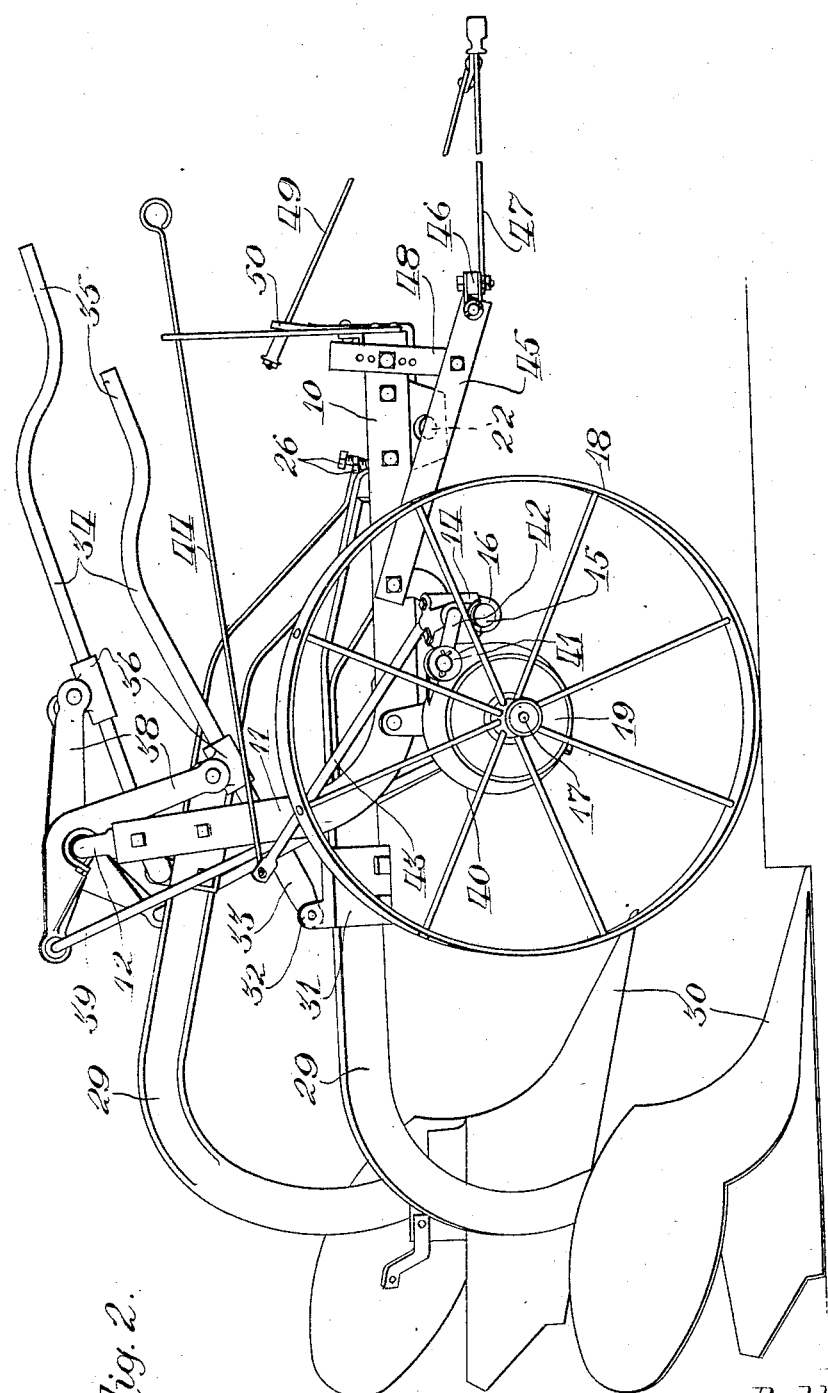
Figure 2 is a side elevation of the same.

In each of the first three figures above described, the parts are shown in the position assumed when the right hand plow is in lowered or operating position and the left hand plow in raised or idle position.

In the present instance, the invention is illustrated as embodied in a plow structure comprising a main frame of open formation and comprising a horizontal, forwardly extending arched portion and a rear, upwardly arched portion. In the present instance this frame is shown as consisting of side bars 10 formed with upwardly angular extensions 11 at their rear ends, which are connected by a transverse cylindrical bar 12 forming the bight portion of the upwardly extending rear arch. The forward ends of the side bars 10 of the frame are rigidly connected as by a transverse yoke member 13. At the angle or junction between the horizontal and vertical portions of the side bars 10, each outer side of the frame has secured thereto a bearing bracket 14. A spreader bar 15 extends across the frame and is rigidly secured to the respective bearing brackets 14 as by U-bolts 16. The bearing brackets 14 are provided with transverse bearings and the brackets are so connected to the frame as to dispose the bearings and the respective brackets on axes converging upwardly at angles of about 10° from horizontal towards the central longitudinal vertical plane of the machine, as best seen in Figure 3.

Each of the bearing brackets has journaled therein a stub axle 17, which projects outwardly beyond the bracket and has journaled thereon a supporting wheel 18, the hub of which has integrally formed therewith one member 19 of an intermittent clutch mechanism of the half revolution type. At the inner end of each stub axle there is provided a crank arm 20. A central, longitudinal bar or brace 21 connects the mid-portion of the spreader bar 15 with the forward end of the plow frame.

At the forward end of the plow frame two transversely extending, cylindrical draft bars 22 are provided. These converge upwardly towards the center line of the frame at substantially the same angle as the stub axles 17 and bearing brackets 14 and are secured to the central bar 21. Each one of the bars 22 has pivoted thereon a rearwardly extending yoke member 23 shown in rear and side elevation in Figures 4 and 5. Near its outer end this yoke member 23 is provided with opposite vertical arms 24 terminating in vertically aligned, apertured ears 25. The ears 25 carry adjusting screws 26, as best seen in Figure 4, and these are positioned to engage the upper and lower edges of an agularly bent bar 27 (Figure 1) constituting the head piece or coupling member on the forward end of each plow beam. As seen in Figure 1, the bar 27 is formed to provide a laterally extended flat front piece and at its inner end this front piece is pivotally connected, as by a bolt 28, with the inner end of the member 23.

With this construction, adjustment of the set bolts or screws 26 will serve to adjust the beam head about the bolt 28 as an axis, while both the beam head and yoke member 23 may pivot on the bar 22. As best seen in Figure 1, each angularly bent bar 27 forms a coupling member for a rearwardly extending plow beam 29 carrying the usual plow body 30 at its rear end. It will be understood that the structure described is duplicated at each side, thus providing a pair of oppositely facing plow bodies for alternate use as usual in two-way machines.

As means for suspending the rear portions of the plow beams from the plow frame and for providing means of vertical adjustment and lifting and lowering of the plows, the following mechanism is preferably provided for each beam. This mechanism consists of a clamp piece 31 secured on the plow beam at a point thereon somewhat to the rear of the upwardly arched portion of the frame. The upper side of this clamp piece is formed with parallel ears 32 between which there is pivoted a threaded housing 33. This threaded housing rotatably receives the rear end of a forwardly extending rotary adjusting rod 34, which extends forwardly to a position within reach of an operator on a tractor pulling the plow and terminates in a crank handle 35. An intermediate portion of this adjusting rod 34 has a sleeve 36, which is provided with side trunnions pivoted between fork arms 37 on the forward end of a rocking member 38 journaled on one lateral half of the bight piece 12 of the frame arch.

Preferably the lateral halves of the bight piece 12 are disposed in the same angular relation as the stub axles and the front draft bar 22, for a purpose to be later referred to. The rear end of the rocking member 38 is connected by a link 39 with the crank arm 20 of the stub axle at that side of the plow frame. The stub axle 17 has keyed thereto the usual complemental section 40 of the intermittent half revolution clutch of which the adjacent part 19 is the constantly rotated section. The usual trip mechanism for connecting and disconnecting these complemental parts of the clutch are provided and these are controlled by a trip roller 41 carried on a crank arm 42 forming part of a trip shaft 43 journaled in a bearing on the bracket 14 and provided with a forwardly extending pull rod 44 extending within reach of the operator's station on the tractor ahead. The clutch parts are so related that each actuation of the trip will cause the stub axle to be locked to the wheel for a half revolution, thereby causing the crank arm 20 to be swung through an arc of 180 degrees and from a position directly above the stub axle to one diametrically below. This movement is communicated to the connected rocking member 38, which in turn transmits it to the connected plow beam through the suspending connection afforded by the control rod 34, and the plow beam is accordingly alternately raised and lowered on its pivot to the draft bar 22 through successive half revolutions of the wheel driven clutch.

The forward end of the frame is preferably provided with a draft connection of a well known type and comprising forwardly extending side bars 45 pivoted at the rear ends to the side bars of the plow frame and connected at the front ends by a transverse bar 46, from which converging draft bars 47 extend.

Adjustable hanger bars 48 connect the forward ends of each bar 45 with the forward ends of the plow frame. The converging bars 47 are supported by a rearwardly extending suspending link 49, the rear end of which passes through an aperture in an upstanding arm 50, which is preferably formed on the forward end of the central bar 21.

It will be seen that the construction above described affords a plow structure, the latter halves of which comprise plow supporting structure positioned on transverse lines converging upwardly towards the central longitudinal plane of the machine. As best illustrated by Figure 3, this construction serves to set the lower or operating plow in proper plowing position when one wheel or side of the frame is riding in the furrow. That side of the frame riding on the land will then be at approximately horizontal or level position and the weight of the raised plow will be approximately in the central line of the frame. The mechanism described permits each plow to be alternately raised and lowered by actuation of the trip mechanism, and each plow beam can be accurately adjusted for depth and for tilt or winging by the adjusting mechanism described.

There has accordingly been provided a much simplified form of tractor two-way plow embodying novel features of construction and control, and, while the preferred embodiment of the invention has been described by way of example, it will be understood that structural changes are possible within the scope of the invention as defined by the following claims.

What is claimed is:

1. A two-way tractor plow comprising a wheel supported frame having a horizontal forwardly arched portion and a rear upwardly arched portion, a pair of oppositely facing plow bodies having beams pivoted at the forward ends thereof to the forwardly arched portion of the frame, a pair of rocking members pivoted between their ends to the cross-member of the upwardly arched part of the frame, suspension links connecting one arm of the respective levers to intermediate points on the respective plow beams, and means connected to the other arm of each rocking member for separately rocking the members to raise and lower the respective plow beams.

2. A two-way tractor plow comprising a wheel supported frame having a horizontal forwardly arched portion and a rear upwardly arched portion, a pair of oppositely facing plow bodies having beams pivoted at the forward end thereof to the forwardly arched portion of the frame, a pair of rocking members extending longitudinally of the horizontal portion of the frame and pivoted intermediate their ends to the inwardly arched part of the frame, a forwardly extending rotatable adjusting rod pivoted at its rear end on the rear portion of each plow beam and having a pivotal and axially adjustable connection with the forward end of one rocking member, and means connected to the rear end of each rocking member for swinging it to raise and lower the plow beam supported thereby.

3. A two-way tractor plow comprising a wheel supported frame having a horizontal forwardly arched portion and a rear upwardly arched portion, a pair of oppositely facing plow bodies having beams extending forwardly within the forwardly arched portion of the frame, a pair of pivot brackets journaled on upwardly converging shafts on the forward end of said portion of the frame, means connecting the forward ends of the respective plow beams to said brackets for tilting adjustment on longitudinal axes, and vertically shiftable suspending means connecting intermediate points on the respective plow beams with the upwardly arched portion of the frame.

4. A two-way tractor plow comprising a frame having a horizontal forwardly arched portion and a rear upwardly arched portion, bearing brackets secured to each side of the frame at the junction of the horizontal and the upright portions of the frame, stub axles journaled in said brackets and provided with crank arms on their inner ends, wheels journaled on the stub axles, half revolution clutch mechanisms for optionally connecting each wheel to its stub axle, a pair of opposite plows connected within the frame, rocking members for each plow having intermediate pivotal connections on the upwardly arched portion of the frame, a link connecting one end of each member with the crank of a stub axle, and suspending means between each plow and the other end of the respective rocking members.

5. A two-way tractor plow comprising a frame having a horizontal forwardly arched portion and a rear upwardly arched portion, bearing brackets secured to each side of the frame at the junction of the horizontal and the upright portions of the frame, stub axles journaled in said brackets and provided with crank arms on their inner ends, wheels journaled on the stub axles, half revolution clutch mechanisms for optionally connecting each wheel to its stub axle, a pair of opposite plows having beams connected at the forward ends to the forward end of the frame, a pair of rocking members pivoted intermediate their ends to the cross member of the upright portion of the frame, a link connecting one end of each member to a crank on a stub axle, a suspension link connecting the other end of each rocking member with an intermediate point on the respective plow beams, and manually operable means for adjusting the effective length of said suspension links.

6. A two-way plow comprising an open frame structure, a stub axle mounted on each side of the frame with the axes of the axles converging upwardly towards the central longitudinal vertical plane of the frame, a ground wheel on each axle, and a pair of opposite plows supported within the frame with one plow at either side of said plane, each plow being carried on transverse supports extending on lines substantially parallel to the axis of the axle on the corresponding side of the frame.

In testimony whereof I affix my signature.

ARTHUR D. GALLAGHER.